(No Model.)
S. C. MENDENHALL.
SKATE ROLLER.
No. 344,453. Patented June 29, 1886.
FIG. I.
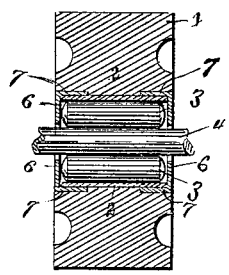
FIG. II.
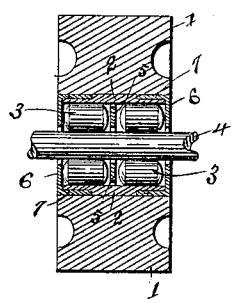
FIG. III.
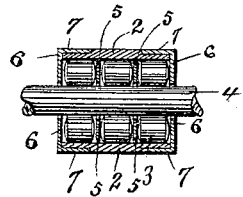
FIG. IV.
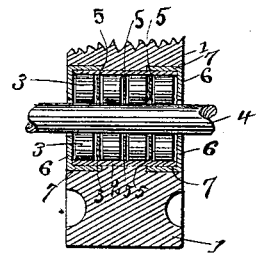
FIG. V.
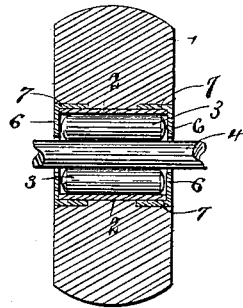
FIG. VI.
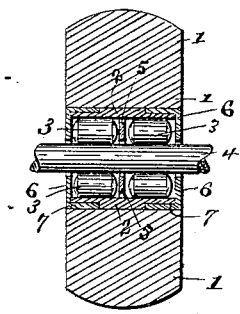
Attest:
F. A. Hopkins
Edward Stuv.
Inventor:
S. C. Mendenhall.
By Knight Bros.
attys.
N. PETERS, Photo-Lithographer, Washington, D. C.

UNITED STATES PATENT OFFICE.

STEPHEN C. MENDENHALL, OF RICHMOND, INDIANA.

SKATE-ROLLER.

SPECIFICATION forming part of Letters Patent No. 344,453, dated June 29, 1886.

Application filed October 20, 1885. Serial No. 180,455. (No model.)

*To all whom it may concern:*

Be it known that I, STEPHEN C. MENDENHALL, a citizen of the United States, residing at Richmond, Wayne county, Indiana, (present business address Cincinnati, Ohio,) have invented certain new and useful Improvements in Skate or Caster Rollers, of which the following is a specification.

My improvements relate to those devices whereby the ordinary floor wheels or rollers of skates or casters are provided with a perfect anti-friction bushing having a bearing upon the journal extending from side to side of the roller.

To these ends my invention particularly consists in the providing of such floor wheels or rollers with an enlarged axial opening, driving or otherwise fixing tightly within said opening a tube, preferably of drawn brass or steel, arranging within the tube one long or two or more short series of loose anti-friction rollers in such a manner as to provide a practically-continuous bearing upon the journal, and pressing a cap on each end of the tube, for retaining the rollers in position. In case two or more series of rollers are employed, loose rings are inserted between each series, to prevent the contact of the ends of the rollers with each other, and to further lessen the friction the ends of all the rollers are rounded or conified.

In order that the invention may be better understood, I will proceed to describe it with reference to the accompanying drawings, which represent in axial section six various modifications of my invention, which will be more particularly described in the sequel.

1 represents the main body of the roller. In Figures I to IV this is shown having a flat floor-surface, this being the preferable form of skate-roller. In Figs. V and VI the bearing-surface is rounded in the ordinary manner with caster-rollers. An enlarged opening is made axially through the roller 1, and within said opening a tube, 2, of such size as to tightly fit the same, is driven. Loose anti-friction rollers 3 are arranged in annular series within the opening bearing upon the tube 2, and themselves affording bearing for the journal or axle 4 of the skate or caster. The rollers may, as shown in Fig. I, be made of a length to extend from side to side of the floor-roller; or they may be shorter, and arranged in several series, as shown in Figs. II, III, and IV. In this case a flat ring or annulus, 5, is placed between each series. It will be observed that by either method the bearing is made practically even on so much of the journal as is within the floor-roller; but it is obvious that should a large number of rollers be employed, as shown in Fig. IV, the bearing will be entirely free from the danger of friction and binding by reason of the unequal rapidity of rotation of the opposite ends of the anti-friction movement. The rollers are held within the tube 2 by means of cap-plates 6, having downturned rims 7, forced around the tube 2. If preferred, the tube may, as shown in Figs. II and III, be slightly offset or shouldered to receive the said rims. Otherwise it might be necessary, in case very hard material were used for the main body of the roller, to provide an enlargement or offset therein to receive the rim 7, as shown in Figs. I and IV.

Having thus described my invention, the following is what I claim as new therein, and desire to secure by Letters Patent:

1. In combination with a floor wheel or roller having the body portion of wood or other material and having a cylindrical axial opening, a tubular bushing occupying said opening, annular series of anti-friction rollers seated within said opening on said tube, and two caps, one driven onto each end of said tube, substantially as and for the purpose set forth.

2. In a floor wheel or roller, in combination with a main portion or body of wood or other material, a metallic tube occupying an axial opening in said roller, two or more annular series of loose anti-friction rollers seated within said opening on said tube, and loose ring or rings interposed between the series of rollers, substantially as and for the purpose set forth.

3. In a floor wheel or roller, a tubular bushing, shouldered as shown, annular series of loose anti-friction rollers within said bushing, and cap-plates having rims driven onto the ends of said tube and seated against the shoulders thereon, substantially as set forth.

STEPHEN C. MENDENHALL.

Witnesses:
 RANKIN D. JONES,
 IDA I. HALL.